Nov. 15, 1938.    H. FRANZÉN    2,137,016
SWIVEL FOR PREVENTING THE TWISTING OF FISHING
LINES OF SPINNING TACKLES AND THE LIKE
Filed Dec. 18, 1937
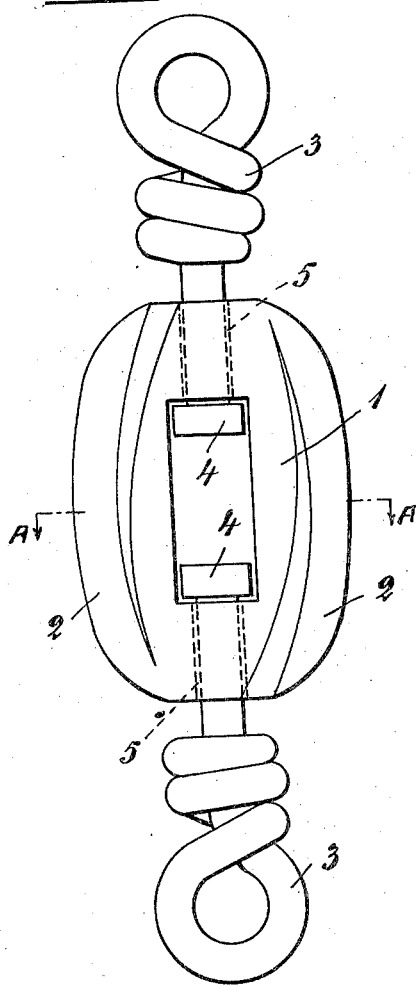
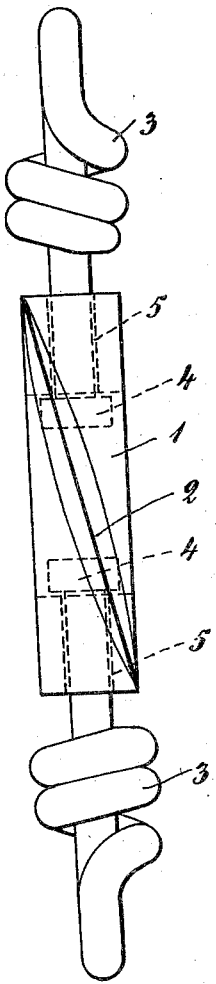
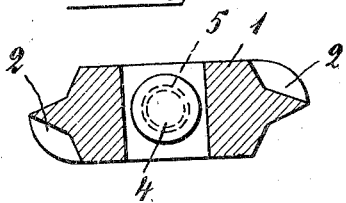
INVENTOR
HJALMAR FRANZÉN
By: Haseltine, Lake & Co.
ATTORNEYS Patented Nov. 15, 1938

2,137,016

UNITED STATES PATENT OFFICE 2,137,016

SWIVEL FOR PREVENTING THE TWISTING OF FISHING LINES OF SPINNING TACKLES AND THE LIKE

Hjalmar Franzén, Bodsjo, Sweden

Application December 18, 1937, Serial No. 180,626
In Sweden January 11, 1937

1 Claim. (Cl. 43—28)

In spinning or similar fishing artificial baits provided with propeller-like blades which, when pulling in or rolling on the line, give the bait a rotating motion, it very often happens that the rotating motion of the bait is transmitted to the line, whereby the latter will be more or less twisted together, depending on the greater or less frictional resistance of the pivots of the swivel connecting the line with the bait.

At the next throw, the line will have a tendency to be entangled due to said twisting, whereby the throw will fail, whereupon a long time has to be spent to clear up the line thus entangled. To prevent such twisting together of the line, it has been usual to provide the end of the line with a weight of such design that its moment of resistance against rotation counteracts the tendency of rotation caused by the rotating bait. The centre of gravity of the weight has for this purpose been located sidewards from the axis of rotation of the line, and the sides of the weight will offer resistance against its rotation in the water. Several different types of such weights are in use. Although the twisting of the line may be prevented by such means, such weights while running in front of the bait are inconvenient as they are apt to irritate and frighten the fish away from the bait.

The present invention has for its object to counteract the twisting of the line in a simple way while eliminating said disadvantage, and the device according to the invention for realizing said object consists of a swivel, one end of which is to be attached to the line while its other end is to be fastened to the swivel of the bait, and a fundamental feature consists therein that the intermediate part or ring of the swivel is provided with screw-shaped propeller blades, which tend to rotate the swivel when it is pulled through the water. When fitting out a spinning tackle, a swivel should be selected on which the thread of the propeller blades of said swivel should run in a direction opposite to the direction of rotation of the bait used.

An embodiment of the invention is illustrated on the accompanying drawing. The figures illustrate in a much enlarged scale a swivel according to the invention. Fig. 1 shows a front view, and Fig. 2 a side view, while Fig. 3 shows a cross-section of the swivel.

In the figures, 1 designates the intermediate part or ring of the swivel, 2 designates wings formed on the opposite outsides of the ring 1. 3 designates the pivot pins for the swivel. The pins 3 are provided with fastening eyes and stop flanges 4, said pins being carried through holes 5 in the ring 1, which holes are wide enough to allow the ring to freely rotate about the pins.

By forming the wings 2 as propeller blades and having a swivel on which the thread runs in a direction opposite to the direction of rotation of the bait, the tendency of the latter to twist the line will be entirely counteracted and thus also the tendency of entangling the line.

Swivels according to the invention may be made in very small sizes and at a very low cost, as such a swivel need not necessarily rotate as many revolutions to the left as the bait is rotating to the right in the same time. During the same time the swivel needs to rotate only so many revolutions that it will counteract the tendency of the bait to rotate the line caused by the frictional resistance of the pivots of the second swivel, to which the bait usually is attached.

It is not necessary that the swivel at both ends be rotatably connected to the line and the tackle respectively; it is enough if the swivel is rotatably connected to the tackle only.

Having now particularly described the nature of my invention and the manner of its operation, what I claim is:

A swivel for preventing the twisting of fishing lines of spinning tackles and the like, consisting of an intermediate part provided with means for securing the swivel to the line and the tackle respectively, said intermediate part being provided with propeller-like wings adapted to create a force tending to rotate the swivel when pulled through the water.

HJALMAR FRANZÉN.